United States Patent
Heisler et al.

(10) Patent No.: US 9,587,068 B2
(45) Date of Patent: Mar. 7, 2017

(54) SILICONE SURFACTANT FOR USE IN POLYURETHANE FOAMS PREPARED USING VEGETABLE OIL BASED POLYOLS

(75) Inventors: Ladislau Heisler, Marietta, OH (US); Gregory A. Pickrell, Parkersburg, WV (US); Lee F. Lawler, Bethel, CT (US)

(73) Assignee: Momentive Performance Materials Inc., Waterford, NY (US)

( * ) Notice: Subject to any disclaimer, the term of this patent is extended or adjusted under 35 U.S.C. 154(b) by 1247 days.

(21) Appl. No.: 12/463,600

(22) Filed: May 11, 2009

(65) Prior Publication Data

US 2010/0286295 A1    Nov. 11, 2010

(51) Int. Cl.

| | |
|---|---|
| *C08G 18/36* | (2006.01) |
| *C08G 18/48* | (2006.01) |
| *C08G 18/66* | (2006.01) |
| *C08G 18/76* | (2006.01) |
| *C08G 18/16* | (2006.01) |
| *C08G 18/18* | (2006.01) |
| *C08G 18/24* | (2006.01) |
| *C08J 9/00* | (2006.01) |
| *C08G 101/00* | (2006.01) |

(52) U.S. Cl.
CPC ........... *C08G 18/36* (2013.01); *C08G 18/165* (2013.01); *C08G 18/1833* (2013.01); *C08G 18/244* (2013.01); *C08G 18/4837* (2013.01); *C08G 18/6662* (2013.01); *C08G 18/7621* (2013.01); *C08G 2101/005* (2013.01); *C08G 2101/0008* (2013.01); *C08G 2101/0083* (2013.01); *C08J 9/0023* (2013.01)

(58) Field of Classification Search
CPC ..................................................... C08J 9/0023
USPC ................................................. 521/170, 174
See application file for complete search history.

(56) References Cited

U.S. PATENT DOCUMENTS

| | | |
|---|---|---|
| 4,814,409 A | 3/1989 | Blevins, II et al. |
| 4,855,329 A | 8/1989 | Blevins, II et al. |
| 5,145,879 A | 9/1992 | Budnik et al. |
| 5,446,185 A | 8/1995 | Cobb et al. |
| 5,488,124 A | 1/1996 | Cobb et al. |
| 5,525,640 A * | 6/1996 | Gerkin et al. ................. 521/112 |
| 5,665,287 A | 9/1997 | Fiorentini et al. |
| 5,670,686 A | 9/1997 | Cobb et al. |
| 6,005,014 A | 12/1999 | Blackwell et al. |
| 6,147,133 A | 11/2000 | Sulzbach et al. |
| 6,326,413 B1 | 12/2001 | Blackwell et al. |
| 6,653,359 B2 | 11/2003 | Hilker et al. |
| 2006/0229375 A1 * | 10/2006 | Hsiao et al. .................. 521/172 |
| 2006/0235100 A1 | 10/2006 | Kaushiva et al. |
| 2006/0270747 A1 * | 11/2006 | Griggs .......................... 521/172 |
| 2007/0238798 A1 | 10/2007 | McDaniel et al. |

OTHER PUBLICATIONS

Ricardo De Genova, Yusuf Wazirzada; Advances in Natural Oil based Polyols chemistry and Supply Options for the Flexible Slabstock Foam Industry: Polyurethane Foam Associated, May 2007, Technical Program Proceedings.
Ling Zhang, Chris Macosko, Timothy W. Abraham, Gary Johnson, Mark Listemann; How Does Soybean Oil Polyol Change Foaming Kinetics in Polyurethane Flexible Foams; Polyurethanes 2008 Technical Conference Proceedings.
Romeo Stanciu, Paul Farkas, Hamdy Khalil, Askar Karami, Liberato Mendoza, Yosuf Wazirzada; High Level Bio-Polyol inclusion in Moulded flexible PU Foams; Polyurethanes 2007 Technical Conference Proceedings.
Ralf Hoffman, Erin Kelly and Johannes Buscher; Additives for Emulsions and Dispersions in Flexible Foam Formulations; Polyurethanes 2007 Technical Conference Proceedings.
International Search Report, Momentive Performance Materials, Inc., Jun. 30, 2010.

* cited by examiner

*Primary Examiner* — Melissa Rioja
(74) *Attorney, Agent, or Firm* — Joseph E. Waters; McDonald Hopkins LLC

(57) ABSTRACT

Silicone surfactants for use in polyurethane foams prepared using natural oils based polyols comprise silicone copolymers possessing alkyl and polyalkylene oxide polyether pendants. The silicone surfactants yield foams having improved physical properties as compared to other surfactant compositions when used in vegetable oil based urethane foams.

22 Claims, No Drawings

SILICONE SURFACTANT FOR USE IN POLYURETHANE FOAMS PREPARED USING VEGETABLE OIL BASED POLYOLS

BACKGROUND

The present embodiments relate to silicone surfactants for use in polyurethane foams. More particularly, the present embodiments relate to silicone surfactants having dimethyl siloxane backbones with attached alkyl and polyether pendant groups that provide improved properties for flexible urethane foam compositions utilizing vegetable oil based polyols.

Polyurethane foams are extensively used in a variety of industrial and consumer applications. The general production of polyurethane foams is well known to those skilled in the art. Polyurethanes are produced from the reaction of isocyanate groups present in polyisocyanates with hydroxyl groups present in polyols. The polyurethane foam production, the reaction of polyisocyanates with polyols, is carried out in the presence of several additives: surfactants, catalysts, cross-linking agents, flame retardants, water, blowing agents, and other additives. Surfactants are typically necessary during the polyurethane foam manufacturing process, and have a significant impact on the final polyurethane foam physical properties. Most conventional type surfactants are based on siloxane/polyether copolymers. Flexible polyurethane foams, a subcategory of the polyurethane foams, are generally soft, less dense, pliable, and subject to structural rebound subsequent to loading.

Polyols used in the production of polyurethanes are typically petrochemical in origin, being generally derived from propylene oxide, ethylene oxide and various starters such as propylene glycol, glycerin, sucrose and sorbitol. Polyether polyols are the most common polyols used in polyurethane production. For flexible foams, polyether polyols with molecular weights of from about 2,000 to 10,000 are generally used. These type of polyols contribute to the depletion of petroleum-derived oil, a non-renewable resource.

Thus, in recent years, vegetable oils based polyols have penetrated a variety of polyurethane applications. Growing consumer demand for "greener" products and the depletion of non-renewable resources have created increasing demand for polyurethane foams produced with renewable content. Derived from renewable resources, vegetable oils based polyols, also known as "natural oil based polyols" (NOP), present an alternative to petroleum-based feedstock. As both polyols suppliers and polyurethane foam producers have recognized this opportunity, NOP are increasingly used in a broad range of polyurethane foams, in combination with petroleum based polyols.

NOP currently used in polyurethane foams are usually based on at least one vegetable oil, including but not limited to soybean, castor, sunflower, canola, linseed, cottonseed, tung, palm, poppy seed, corn and peanut. In one respect, NOP may generally be categorized as hydroxylated vegetable oils or alkoxylated vegetable oils, depending on the extent and the nature of the chemical modifications the vegetable oils are subjected to. These are commercially available from various manufacturers.

The use of petroleum-based polyols in polyurethane foams is a well-established technology that has created products with strict industry requirements. Thus, the attempt to partially or totally substitute them with NOP in the manufacturing of polyurethane foams, has resulted in loss of product quality. This is especially true in the case of flexible polyurethane foams, where increasing incorporation of NOP has a negative impact on the physical properties of the foam.

Nevertheless, because the benefits of using NOP in the production of polyurethanes, particularly from an environmental standpoint, efforts are being made to continue to use them. Thus, solutions to mitigate the negative impact on physical properties resulting from the use of such polyols have been provided mainly by the producers/suppliers of the NOP, and are related to incorporating additional polyol components in the foam formulation (US Patent Publication No. 2006/0235100) or structural modifications of the vegetable oils based polyols (US Patent Publication No. 2007/0238798).

The present invention works to minimize or eliminate the loss of foam physical properties in flexible polyurethane foam formulations manufactured using NOP by using a specific surfactant composition. There are no previous solutions to the physical property issues encountered when using NOP in urethane foams that address the problem by using modified structure siloxane/polyether/alkyl surfactants, the subject of the present invention.

For comparison purposes, U.S. Pat. No. 6,653,359 describes a conventional siloxane/polyether surfactant. The use of these prior types of surfactants in flexible polyurethane foam formulations using vegetable oils based polyols results in degraded physical properties for the foam. In contrast, the siloxane/polyether/alkyl surfactants presented in this invention provide improved foam physical properties for the foam compared to prior art surfactants, enabling increased use levels of NOP into the flexible polyurethane foam formulations.

BRIEF DESCRIPTION

The present embodiments are directed to certain surfactants that are silicone copolymers possessing polyalkylene oxide polyether and alkyl pendants that yield polyurethane foams made using NOP having improved properties as compared to other surfactant compositions.

More particularly, the present invention is directed to a method of producing a polyurethane foam including:
A) preparing a mixture including:
 (1) a polyol including a vegetable oil derived polyol,
 (2) an organic polyisocyanate,
 (3) at least one catalyst for the production of polyurethane foams,
 (4) water, and
 (5) a surfactant; having the formula:

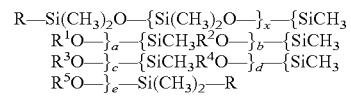

or

Wherein:
$R^1$, $R^2$, and $R^3$ are polyalkylene oxide polyethers of the formula:

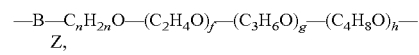

and where
$R^1$ has a blend average molecular weight ("BAMW", the numerical molar average molecular weight of a mixture of one or more distinctly different compositions) in the range of from about 3000 to about 6000 grams/mole and ethylene oxide comprises from about 20 to about 60 weight percent of the alkylene oxide content of $R^1$;

$R^2$ has a BAMW in the range of from about 800 to about 2900 grams/mole and ethylene oxide comprises from about 20 to about 60 weight percent of the alkylene oxide content of $R^2$;

$R^3$ has a BAMW in the range of from about 130 to about 800 grams/mole and ethylene oxide comprises from about 0 to about 100 weight percent of the alkylene oxide content of $R^3$;

$R^4$ is a $C_1$ to $C_{12}$ substituted or unsubstituted alkyl group, an alkaryl group, or an aryl group;

$R^5$ is a $C_{14}$ to $C_{30}$ substituted or unsubstituted alkyl or alkaryl group;

B is a moiety capable of undergoing hydrosilation to form Si—C bonds, or a moiety capable of undergoing condensation to form Si—O—C bonds;

Z is selected from the group consisting of hydrogen, $C_1$-$C_8$ alkyl or alkaryl moieties, —C(O)$Z^1$, —C(O)O$Z^1$, and —C(O)NH$Z^1$, Where $Z^1$ represents mono-functional $C_1$-$C_8$ alkyl or aryl moieties;

Each R is independently selected from the group consisting of $R^1$, $R^2$, $R^3$, $R^4$, and $R^5$;

Each $R^6$ is independently selected from the group consisting of $R^1$, $R^2$, $R^3$, $R^4$, and $R^5$ but at least one $R^6$ must be $R^5$ x is 40 to 150;

y is 5 to 40 and equals a+b+c+d+e,
where b or c, but not both, may be 0,
d/(a+b+c+e)=0 to 1, and
e>0, and
a+b>0, m=10 to 100 n≤4, and f, g, and h can be independently selected to have any value such that the defined BAMWs of the polyethers $R^1$, $R^2$, and $R^3$ are met; and B) reacting components 1)-5) of the mixture to form polyurethane foam.

In a second embodiment, there is provided a urethane foam comprising the reaction product of:

(1) a polyol including a vegetable oil derived polyol,
(2) an organic polyisocyanate,
(3) at least one catalyst for the production of polyurethane foams,
(4) water, and
(5) a surfactant; having the formula:

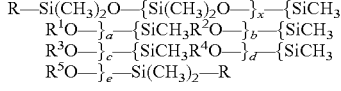

or

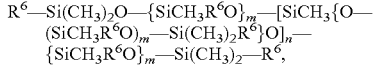

Wherein:

$R^1$, $R^2$, and $R^3$ are polyalkylene oxide polyethers of the formula:

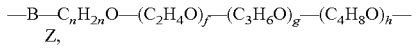

and where $R^1$ has a blend average molecular weight ("BAMW", the numerical molar average molecular weight of a mixture of one or more distinctly different compositions) in the range of from about 3000 to about 6000 grams/mole and ethylene oxide comprises from about 20 to about 60 weight percent of the alkylene oxide content of $R^1$;

$R^2$ has a BAMW in the range of from about 800 to about 2900 grams/mole and ethylene oxide comprises from about 20 to about 60 weight percent of the alkylene oxide content of $R^2$;

$R^3$ has a BAMW in the range of from about 130 to about 800 grams/mole and ethylene oxide comprises from about 0 to about 100 weight percent of the alkylene oxide content of $R^3$;

$R^4$ is a $C_1$ to $C_{12}$ substituted or unsubstituted alkyl group, an alkaryl group, or an aryl group;

$R^5$ is a $C_{14}$ to $C_{30}$ substituted or unsubstituted alkyl or alkaryl group;

B is a moiety capable of undergoing hydrosilation to form Si—C bonds, or a moiety capable of undergoing condensation to form Si—O—C bonds;

Z is selected from the group consisting of hydrogen, $C_1$-$C_8$ alkyl or alkaryl moieties, —C(O)$Z^1$, —C(O)O$Z^1$, and —C(O)NH$Z^1$, Where $Z^1$ represents mono-functional $C_1$-$C_8$ alkyl or aryl moieties;

Each R is independently selected from the group consisting of $R^1$, $R^2$, $R^3$, $R^4$, and $R^5$;

Each $R^6$ is independently selected from the group consisting of $R^1$, $R^2$, $R^3$, $R^4$, and $R^5$ but at least one $R^6$ must be $R^5$ x is 40 to 150;

y is 5 to 40 and equals a+b+c+d+e,
where b or c, but not both, may be 0,
d/(a+b+c+e)=0 to 1, and
e>0, and
a+b>0, m=10 to 100 n≤4, and f, g, and h can be independently selected to have any value such that the defined BAMWs of the polyethers $R^1$, $R^2$, and $R^3$ are met.

DETAILED DESCRIPTION

Previously, it was not expected that changing the identity of the surfactant would change the physical properties of NOP based polyurethane foams. However, the present invention has surprisingly identified certain classes of surfactants that improve the properties of such foams as compared to conventional urethane foam surfactants. The surfactants are also suitable for use in conventional petroleum based polyol foams.

Petroleum based polyols are synthesized from glycerol (or other —OH containing starters), which is reacted via known reactions with petroleum-based ethylene oxide and propylene oxide, to form polyether polyols having a variety of ethylene oxide/propylene oxide (EO/PO) combinations and molecular weights. The number of —OH groups in the polyol are determined by the identity of the starting compound, with the EO/PO ratio controlling the polarity of the compound.

NOP, on the other hand, are derived from vegetable oils, which are a renewable "green" resource, and mainly consist of triglycerides. For these polyols to be useful in the polyurethane formation, they must contain —OH groups in the fatty acid chains of the triglyceride. Some vegetable oils (castor oil) already contain these hydroxyl —OH groups. Others, such as soybean oil, contain double bonds. Vegetable oils without OH groups are therefore generally chemically modified through known reactions to contain various functional groups, such as —OH groups. If only hydroxyl groups are added, the NOP may be called "hydroxylated". Such polyols have very different physical and chemical properties compared to petroleum based polyols. If the hydroxyl groups in such NOP are further chemically modified to contain alkoxy groups, the NOP may be designated as "alkoxylated".

Generally, the less chemically modified the vegetable oil in the NOP, the more renewable it is. Thus, "hydroxylated" vegetable oils based polyols generally have higher levels of renewable component in them, compared to "alkoxylated" vegetable oils polyols, or those further or more significantly chemically modified. The surfactants of the present invention can be used with both "alkoxylated" and "hydroxylated" NOP, as well as any other NOP derived from chemically modified vegetable oils, but the most significant improvement on the properties of the final foam over that found with conventional surfactants is when "hydroxylated" vegetable oil polyols are used in flexible foam formulations.

This present invention describes a class of silicone surfactants, containing alkyl pendants on the siloxane backbone, in addition to polyether pendants. These siloxane/polyether/alkyl surfactants for flexible polyurethane foam applications, provide improved foam physical properties in flexible polyurethane foams that use NOP in combination with petroleum-derived polyols, when compared to conventional siloxane/polyether surfactants. These siloxane/polyether/alkyl surfactants enable greater levels of NOP incorporation in the flexible foam formulations.

One feature of the surfactants subject of this invention are the alkyl pendants grafted on the siloxane backbone, in addition to the polyether pendants. The subject surfactants of this invention contain both alkyl and polyether pendants as detailed below.

As stated above, the present invention may be suitable for use in conventionally produced flexible polyurethane foams, as well as in those using Dissolved Gas Technology, which use an inert gas blowing agent in the production of the foam, as described more fully in U.S. Pat. No. 6,653,359. When used in Dissolved Gas Technology foams, the present surfactants are preferably low to moderate MW and possess no high EO content branches, as described below.

This finding of improved physical properties and the excellent performance of NOP based foams using the silicone copolymers of the present invention was particularly unexpected, since similar silicone copolymers (as exemplified in U.S. Pat. No. 6,653,359) were not as successful in producing high quality urethane foams using NOP.

Surfactant Structure

The silicone surfactants of the present invention have dimethyl siloxane backbones with attached alky and polyalkylene oxide polyether pendant groups. The pendants can be attached to the siloxane backbone either via Si—C bonds or Si—O—C bonds. The Si—C bonds in these copolymers are hydrolytically stable, and many of these surfactants can be used in water amine premixes and are preferably designed with flame-retardant characteristics for use in flame retardant foam compositions.

The surfactants employed in the practice of this invention are silicone/polyether/alkyl compositions having one of the following generalized average formulae:

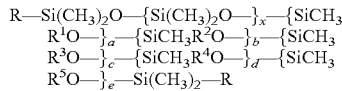

or

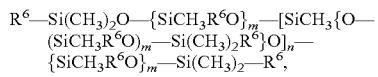

Wherein:

$R^1$, $R^2$, and $R^3$ are polyalkylene oxide polyethers of the formula:

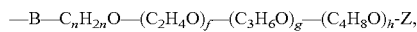

and where $R^1$ has a blend average molecular weight ("BAMW", the numerical molar average molecular weight of a mixture of one or more distinctly different compositions) in the range of from about 3000 to about 6000 grams/mole and ethylene oxide comprises from about 20 to about 60 weight percent of the alkylene oxide content of $R^1$;

$R^2$ has a BAMW in the range of from about 800 to about 2900 grams/mole and ethylene oxide comprises from about 20 to about 60 weight percent of the alkylene oxide content of $R^2$;

$R^3$ has a BAMW in the range of from about 130 to about 800 grams/mole and ethylene oxide comprises from about 0 to about 100 weight percent of the alkylene oxide content of $R^3$;

$R^4$ is a $C_1$ to $C_{12}$ substituted or unsubstituted alkyl group, an alkaryl group, or an aryl group;

$R^5$ is a $C_{14}$ to $C_{30}$ substituted or unsubstituted alkyl or alkaryl group;

B is a moiety capable of undergoing hydrosilation to form Si—C bonds, or a moiety capable of undergoing condensation to form Si—O—C bonds;

Z is selected from the group consisting of hydrogen, $C_1$-$C_8$ alkyl or alkaryl moieties, —C(O)$Z^1$, —C(O)O$Z^1$, and —C(O)NH$Z^1$, Where $Z^1$ represents mono-functional $C_1$-$C_8$ alkyl or aryl moieties;

Each R is independently selected from the group consisting of $R^1$, $R^2$, $R^3$, $R^4$, and $R^5$;

Each $R^6$ is independently selected from the group consisting of $R^1$, $R^2$, $R^3$, $R^4$, and $R^5$ but at least one $R^6$ must be $R^5$ x is 40 to 150;

y is 5 to 40 and equals a+b+c+d+e,
where b or c, but not both, may be 0,
d/(a+b+c+e)=0 to 1, and
e>0, and
a+b>0, m=10 to 100 n≤4, and f, g, and h can be independently selected to have any value such that the defined BAMWs of the polyethers $R^1$, $R^2$, and $R^3$ are met.

The $R^1$ moieties are preferably in the range of from about 35 to about 55% by weight of EO and, more preferably, about 40% EO. It is preferred that such moieties have a BAMW greater than 3500 daltons, and, more preferably, greater than 4000 daltons. The $R^2$ moieties are also preferably in the range of from about 35 to about 55% by weight of EO and, more preferably, about 40% EO. Preferably, such moieties have a BAMW in the range of from about 1100 to about 2300 daltons and, more preferably, about 1400 to about 1600 daltons. The $R^3$ moieties range from 0 up to about 100% by weight of EO, preferably 0-40% EO. It is preferred that these moieties, when present, have a BAMW in the range of from about 300 to about 750 daltons.

There may also be more than one different polyether from each group. For example, a copolymer may comprise (a) two $R^1$-type polyethers differing in molecular weight and/or EO-content, and (b) an $R^2$-type polyether. In addition, butylene oxide can be substituted for propylene oxide in the polyether backbone.

The polyether moieties can be linear or branched and can contain any number of carbon atoms.

Z is preferably —C(O)CH$_3$ or CH$_3$. B is preferably an allyl derivative, e.g., propyl, or a methalyl derivative, e.g., isobutyl The $R^5$ moieties preferably contain carbon atoms in the range of $C_{16}$ to $C_{20}$.

Particularly preferred surfactant compositions of the present invention comprise of x in the range of from 60 to about 80, y in the range of from 5 to about 20, a+c in the range of from 5 to about 15, and e in the range from about 5 to 10.

For optimal performance in $CO_2$ inert gas blown foams the copolymer preferably has an average target MW with low to moderate values, e.g., less than about 21,000 daltons, with 0 mole percent of the $R^1$, $R^2$, and $R^3$ polyalkylene oxide polyethers branches being ≥75% by weight EO content.

In addition, the present surfactants may be formulated to possess increased fire retardant properties, which are generally greatly desired for use in many polyurethane foam applications. For improved FR performance, the surfactant is preferably formulated such that the compositions possesses an x/y ratio of less than or equal to about 10.

Preparation of this type of copolymers can be accomplished via known reactions and processes, for example as disclosed in U.S. Pat. Nos. 4,814,409 and 5,145,879, which are incorporated herein as reference. The alkyl groups may be added via known hydrosilylation reactions of molecules possessing terminal unsaturation or via known condensation reactions of molecules possessing terminal hydroxyl.

Polyurethane Foam

The surfactants employed in the practice of the present invention are used in the preparation of urethane foams using NOP. Such foams may be conventionally produced or those that are blown using Dissolved Gas Technology, which use supplemental added inert gases such as $CO_2$, as discussed in U.S. Pat. No. 6,653,359. A given foam is usually comprised, at a minimum, of (a) a polyol including a vegetable oil derived polyol containing an average of more than one hydroxyl groups per molecule; (b) an organic polyisocyanate; (c) at least one catalyst for the production of polyurethane foams; (d) water; and (e) a surfactant as defined herein. All of these materials, except for (e) may be those conventionally used and known in the art for the production of flexible polyurethane foams. See, e.g., U.S. Pat. Nos. 4,814,409 and 4,855,329, which are incorporated herein by reference. These components may be used in conventional proportions and amounts generally known in the art for producing flexible polyurethane foams.

The polyols can include polyols having from about 1 up to about 100 weight percent NOP of the total polyol amount, with the remainder being conventional petroleum based polyols. Generally, the physical properties of the final foam will degrade as the amount of NOP compared to petroleum-based polyol used is increased. The extent of degradation will depend on the identity of the NOP, including the extent of its chemical modification, including, e.g., whether it is alkoxylated or hydroxylated. Therefore, while possible, most foams are not made from polyols containing 100% NOP, but instead are made using polyols containing a mixture of both NOP and petroleum-based polyol. Typically, therefore, depending on a number of factors, including the intended application of the final foam and the physical properties required therefore as well as the identity and chemical makeup of the NOP, manufacturers of "green" foam may use polyols having from about 1 to about 80 weight NOP content, with about 10 to about 40 percent being most common.

As noted above, the present surfactants can be used in conventional foams based solely on petroleum-based polyols (with no NOP content) to produce foams with comparable properties to those observed with conventional surfactants. However, the main benefits of the present surfactants are obtained when a portion of the petroleum-based polyol is replaced with NOP. In such instances, the use of the present surfactants result in foams having increased porosity, improved compression set, improved tensile strength, improved elongation, and improved tear strength.

The organic polyisocyanates used in the polyurethane foams may be conventional materials well known in the art. They may contain at least two isocyanate groups, e.g., toluene diisocyanates (TDI), and the TDI index of the foam is typically 60 to 130.

The catalyst may be one of those known in the art for the production of flexible polyurethane foams, and may be, e.g., an amine, such as triethylene diamine, bis(2-dimethylaminoethyl)ether, or mixtures thereof, and certain metal catalysts, including organic derivatives of tin, particularly tin compounds of octanoic acid or lauric acid.

Other additives may be added to the polyurethane foam to impart specific properties to the foam, including, but not limited to, coloring agents, flame-retardants, and GEOLITE® Modifier foam additives (available from Momentive Performance Materials, Inc.).

If Dissolved Gas Technology (inert gas technology) is used to produce the foam, the inert gas is one that is soluble in the foam formulation at elevated pressures, but will come out of solution, i.e., blow, at atmospheric pressure. An example of such a gas is $CO_2$, but nitrogen, air, or other common gases, including hydrocarbon gases, such as methane and ethane, can also be used.

The surfactants should be of the type described above and may be present in an amount of from about 0.05 to about 5.0 wt. percent of the total reaction mixture, preferably from about 0.8 to about 2.0 wt. percent.

The foam is manufactured by mixing the ingredients together and letting them react in accordance with known procedures. If inert gas technology is used, the ingredients are mixed and put under high pressure, i.e., a pressure that is at least greater than atmospheric pressure, so that the inert gas is dissolved in the foaming mixture. Then, the mixture is subjected to controlled pressure reduction, which causes the gas to form bubbles at nucleation sites in the foaming system and thus act as a blowing agent. For a more complete description of the process and the equipment required therein, see European Patent Publication No. 0 645 226 or an equivalent thereof, e.g, U.S. Pat. No. 5,665,287; as well as U.S. Pat. No. 6,005,014; U.S. Pat. No. 6,147,133, and U.S. Pat. No. 6,326,413.

The foam cell structure is typically uniform and fine and the bulk foam stability is good to excellent when foams are prepared with the noted surfactant compositions.

The surfactants described herein can be used in flexible slabstock foams. The polyurethane foams produced in accordance with the present invention can be used in the same fields as conventional flexible slabstock polyurethane foams.

The advantages and the important features of the present invention will be more apparent from the following examples.

EXAMPLES

Various flexible polyurethane foams were produced with polyols containing from 0-40% NOP, with the remainder being a conventional petroleum based polyol. In the comparative examples, prior art surfactants based on those described in U.S. Pat. No. 6,653,359 were used. In the experimental examples, a surfactant according to the present invention was used.

These samples were prepared in accordance with known and conventional foaming procedures in the laboratory. The composition of the foams studied are set forth in Table 1 below. The numbers represent parts per hundred parts polyol.

The silicone surfactants used in the examples below were as follows:

Silicone surfactant A has the formula $MD_xD'_yM$, wherein,
  M is $(CH_3)_3SiO_{1/2}$—
  D is —$O_{1/2}Si(CH_3)_2O_{1/2}$—
  D' is —$O_{1/2}Si(CH_3)R'O_{1/2}$—
  R' is composed of two different acetoxy capped polyethers with the branches being <75% by weight EO content and having a target average MW of about 17,400 daltons. The R' pendants are attached to the siloxane backbone via Si—C bonds.

Silicone surfactant B has the formula $MD_xD'_yD''_zM$,
Wherein,
M is $(CH_3)_3SiO_{1/2}$—
D is $—O_{1/2}Si(CH_3)_2O_{1/2}$—
D' is $—O_{1/2}Si(CH_3)R'O_{1/2}$—
D'' is $—O_{1/2}Si(CH_3)R''O_{1/2}$—
R' is composed of two different acetoxy capped polyethers with the branches being <75% by weight EO content,
R'' is octadecyl alkyl pendant, with a target MW of about 19,100 daltons. The R' and R'' pendants are attached to the siloxane backbone via Si—C bonds.

While the subject novel concept has been described with reference to the foregoing embodiments and considerable emphasis has been placed herein on the structures and structural interrelationships between the component parts of the embodiments disclosed, it will be appreciated that other embodiments can be made and that many changes can be made in the embodiments illustrated and described without departing from the principles of the subject novel concept. Obviously, modifications and alterations will occur to others upon reading and understanding the preceding detailed description. Accordingly, it is to be distinctly understood that the foregoing descriptive matter is to be interpreted merely as illustrative of the present novel concept and not as

TABLE 1

| | Comp Ex 1 | Comp Ex 2 | Comp Ex 3 | Comp Ex 4 | Comp Ex 5 | Ex 1 | Ex 2 | Ex 3 | Ex 4 | Ex 5 |
|---|---|---|---|---|---|---|---|---|---|---|
| Polyether Polyol Carpol ® GP-3008 (Carpenter)[1] | 100 | 85 | 70 | 65 | 60 | 100 | 85 | 70 | 65 | 60 |
| BiOH ® –5000 (Cargill)[2] | 0 | 15 | 30 | 35 | 40 | 0 | 15 | 30 | 35 | 40 |
| Niax ® stannous octoate catalyst | 0.20 | 0.20 | 0.20 | 0.20 | 0.20 | 0.20 | 0.20 | 0.20 | 0.20 | 0.20 |
| Niax ® Catalyst A-1 amine catalyst[5] | 0.10 | 0.10 | 0.10 | 0.10 | 0.10 | 0.10 | 0.10 | 0.10 | 0.10 | 0.10 |
| Water | 4.0 | 4.0 | 4.0 | 4.0 | 4.0 | 4.0 | 4.0 | 4.0 | 4.0 | 4.0 |
| Silicone A (prior art surfactant)[3] | 1.0 | 1.0 | 1.0 | 1.0 | 1.0 | | | | | |
| Silicone B (present invention)[4] | | | | | | 1.0 | 1.0 | 1.0 | 1.0 | 1.0 |
| TDI Index | 105 | 105 | 105 | 105 | 105 | 105 | 105 | 105 | 105 | 105 |
| TDI 80/20 | 49.7 | 49.7 | 49.7 | 49.7 | 49.7 | 49.7 | 49.7 | 49.7 | 49.7 | 49.7 |

[1] a nominally trifunctional petroleum based slabstock glycerin-based polyol having an ethylene oxide content of 8%, a MW of 3000 daltons, and approximately 56 OH number
[2] a nominally difunctional soybean oil based polyol having a MW of 1700 daltons, and approximately 56 OH number
[3] defined above
[4] defined above
[5] N,N-bis(dimethylaminoethyl)ether (70% in dipropylene glycol)

The physical properties of the resultant foams were measured and the results are set forth in Table 2.

TABLE 2

| Results | Comp Ex 1 | Comp Ex 2 | Comp Ex 3 | Comp Ex 4 | Comp Ex 5 | Ex 1 | Ex 2 | Ex 3 | Ex 4 | Ex 5 |
|---|---|---|---|---|---|---|---|---|---|---|
| Rise Time (sec) | 80 | 90 | 102 | 107 | 113 | 74 | 81 | 91 | 97 | 103 |
| Final Height (cm) | 22.4 | 22.4 | 22.2 | 21.8 | 21.8 | 20.7 | 21.4 | 20.9 | 20.7 | 20.7 |
| Settling (%) | 1.0 | 1.1 | 1.2 | 2.0 | 1.1 | 6.7 | 3.7 | 2.1 | 3.0 | 3.1 |
| Porosity (ft3/min) | 5.0 | 5.1 | 4.2 | 3.8 | 3.5 | 5.3 | 6.2 | 6.1 | 6.1 | 6.2 |
| Density (lb/ft3) | 1.52 | 1.49 | 1.50 | 1.49 | 1.48 | 1.55 | 1.55 | 1.58 | 1.57 | 1.57 |
| IFD 25% (lb/50 in2) | 33.6 | 29.4 | 26.6 | 24.6 | 23.3 | 34.1 | 30.1 | 28.3 | 26.2 | 25.0 |
| IFD 65% (lb/50 in2) | 67.1 | 60.4 | 57.1 | 53.7 | 51.5 | 67.1 | 60.6 | 58.4 | 54.9 | 52.9 |
| IFD 25% return (lb/50 in2) | 23.0 | 19.5 | 17.0 | 15.7 | 14.8 | 23.8 | 19.9 | 18.2 | 16.6 | 16.0 |
| Percent recovery | 68 | 66 | 64 | 64 | 63 | 70 | 66 | 64 | 63 | 64 |
| Comfort factor | 2.0 | 2.1 | 2.1 | 2.2 | 2.2 | 2.0 | 2.0 | 2.1 | 2.1 | 2.1 |
| Compression set. 90% (%) | 7.4 | 8.9 | 62.0 | 82.0 | 85.5 | 7.1 | 7.3 | 10.1 | 11.9 | 71.8 |
| Tensile strenth (lb/in2) | 13.7 | 12.6 | 11.0 | 10.7 | 10.2 | 15.5 | 13.6 | 12.3 | 11.9 | 11.1 |
| Elongation (%) | 247 | 237 | 196 | 194 | 178 | 259 | 236 | 204 | 206 | 178 |
| Tear stregth (lb/in) | 2.4 | 1.8 | 1.4 | 1.3 | 1.1 | 2.7 | 2.4 | 1.8 | 1.7 | 1.4 |
| Resilience (%) | 36 | 32 | 28 | 26 | 25 | 35 | 29 | 27 | 26 | 25 |

As can be seen, in both the comparative examples and the inventive examples, the physical properties degrade as the amount of NOP in the foam increases. However, it can clearly be seen that less degradation in physical properties occurs in those samples using the present surfactants, as compared to those using the prior art surfactants. That is, results indicate better foam physical properties when silicone B (present invention) is used in foam formulations: including increased foam porosity, as well as improved IFD, compression set, tensile strength, elongation, and tear strength. Thus, with the use of the present surfactants, the amount of NOP in urethane foams (and thus the "green" content) can be increased while still maintaining acceptable physical properties in the final foam composition.

alterations insofar as they come within the scope of the appended claims and any equivalents thereof.

What is claimed is:
1. A method of producing a flexible polyurethane foam comprising:
   A) preparing a mixture comprising:
      (1) a polyol comprising a vegetable oil derived polyol,
      (2) an organic polyisocyanate,
      (3) at least one catalyst for the production of polyurethane foams,
      (4) water, and
      (5) a surfactant; having the formula:

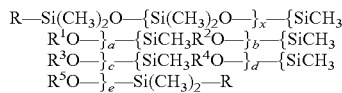

or

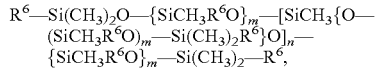

wherein:
R$^1$, R$^2$, and R$^3$ are polyalkylene oxide polyethers of the formula:

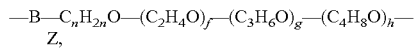

and where
R$^1$ has a blend average molecular weight in the range of from about 3000 to about 6000 grams/mole and ethylene oxide comprises from about 20 to about 60 weight percent of the alkylene oxide content of R$^1$;
R$^2$ has a blend average molecular weight in the range of from about 800 to about 2900 grams/mole and ethylene oxide comprises from about 20 to about 60 weight percent of the alkylene oxide content of R$^2$;
R$^3$ has a blend average molecular weight in the range of from about 130 to about 800 grams/mole and ethylene oxide comprises from about 0 to about 100 weight percent of the alkylene oxide content of R$^3$;
R$^4$ is a $C_1$ to $C_{12}$ substituted or unsubstituted alkyl group, an alkaryl group, or an aryl group;
R$^5$ is a $C_{14}$ to $C_{30}$ substituted or unsubstituted alkyl or alkaryl group;
B is a moiety capable of undergoing hydrosilation to form Si—C bonds, or a moiety capable of undergoing condensation to form Si—O—C bonds;
Z is selected from the group consisting of hydrogen, $C_1$-$C_8$ alkyl or alkaryl moieties, —C(O)Z$^1$, —C(O)OZ$^1$, and —C(O)NHZ$^1$, wherein Z$^1$ represents mono-functional $C_1$-$C_8$ alkyl or aryl moieties;
each R is independently selected from the group consisting of R$^1$, R$^2$, R$^3$, R$^4$, and R$^5$;
each R$^6$ is independently selected from the group consisting of R$^1$, R$^2$, R$^3$, R$^4$, and R$^5$ but at least one R$^6$ must be R$^5$;
x is 40 to 150;
y is 5 to 40 and equals a+b+c+d+e, where b or c, but not both, may be 0, d/(a+b+c+e)=0 to 1, e>0, and a+b>0;
m=10 to 100;
n≤4; and
f, g, and h can be independently selected to have any value such that the defined blend average molecular weights of the polyethers R$^1$, R$^2$, and R$^3$ are met; and
B) reacting components 1)-5) of the mixture to form a flexible polyurethane foam.

2. The method of claim 1, wherein said polyol further comprises a polyether polyol.

3. The method of claim 1, wherein said vegetable oil derived polyol comprises a hydroxylated vegetable oil.

4. The method of claim 1, wherein said vegetable oil derived polyol comprises a alkoxylated vegetable oil.

5. The method of claim 2, wherein said polyol comprises from about 10 to about 60 weight percent of said vegetable oil derived polyol and about 40 to about 90 weight percent polyether polyol.

6. The method of claim 1, wherein R$^5$ is a $C_{16}$ to $C_{20}$ substituted or unsubstituted alkyl or alkaryl group.

7. The method of claim 1, wherein Z comprises —C(O)CH$_3$ or CH$_3$.

8. The method of claim 1, wherein B comprises an allyl derivative.

9. The method of claim 1, further comprising the step of blowing the polyurethane foam with a pressurized gas.

10. The method of claim 1, wherein at least one of the following is true:
a) x in the range of from 60 to about 80,
b) y in the range of from 5 to about 20,
c) a+c in the range of from 5 to about 15, or
d) e in the range from about 5 to 10.

11. The method of claim 1, wherein at least one of the following is true:
a) The R$^1$ moieties are in the range of from about 35 to about 55% by weight of EO and have a blend average molecular weight greater than 3500 daltons;
b) The R$^2$ moieties are in the range of from about 35 to about 55% by weight of EO and have a blend average molecular weight in the range of from about 1100 to about 2300 daltons; or c) The R$^3$ moieties range from 0 up to about 100% by weight of EO and have a blend average molecular weight in the range of from about 300 to about 750 daltons.

12. A flexible polyurethane foam comprising the reaction product of:
(1) a polyol comprising a vegetable oil derived polyol,
(2) an organic polyisocyanate,
(3) at least one catalyst for the production of polyurethane foams,
(4) water, and
(5) a surfactant; having the formula:

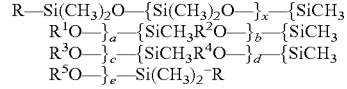

or

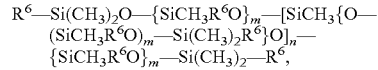

wherein:
R$^1$, R$^2$, and R$^3$ are polyalkylene oxide polyethers of the formula:

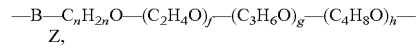

where
R$^1$ has a blend average molecular weight in the range of from about 3000 to about 6000 grams/mole and ethylene oxide comprises from about 20 to about 60 weight percent of the alkylene oxide content of R$^1$;
R$^2$ has a blend average molecular weight in the range of from about 800 to about 2900 grams/mole and ethylene oxide comprises from about 20 to about 60 weight percent of the alkylene oxide content of R$^2$;
R$^3$ has a blend average molecular weight in the range of from about 130 to about 800 grams/mole and ethylene oxide comprises from about 0 to about 100 weight percent of the alkylene oxide content of R$^3$;
R$^4$ is a $C_1$ to $C_{12}$ substituted or unsubstituted alkyl group, an alkaryl group, or an aryl group;
R$^5$ is a $C_{14}$ to $C_{30}$ substituted or unsubstituted alkyl or alkaryl group;
B is a moiety capable of undergoing hydrosilation to form Si—C bonds, or a moiety capable of undergoing condensation to form Si—O—C bonds;
Z is selected from the group consisting of hydrogen, $C_1$-$C_8$ alkyl or alkaryl moieties, —C(O)Z$^1$, —C(O)OZ$^1$, and —C(O)NHZ$^1$, where Z$^1$ represents mono-functional $C_1$-$C_8$ alkyl or aryl moieties;
each R is independently selected from the group consisting of R$^1$, R$^2$, R$^3$, R$^4$, and R$^5$;

each $R^6$ is independently selected from the group consisting of $R^1$, $R^2$, $R^3$, $R^4$, and $R^5$ but at least one $R^6$ must be $R^5$;

x is 40 to 150;

y is 5 to 40 and equals a+b+c+d+e, where b or c, but not both, may be 0, d/(a+b+c+e)=0 to 1, e>0, and a+b>0;

m=10 to 100;

n≤4; and f, g, and h can be independently selected to have any value such that the defined blend average molecular weights of the polyethers $R^1$, $R^2$, and $R^3$ are met.

13. The foam of claim 12, wherein said polyol further comprises a polyether polyol.

14. The method of claim 12, wherein said vegetable oil derived polyol comprises a hydroxylated vegetable oil.

15. The method of claim 12, wherein said vegetable oil derived polyol comprises a alkoxylated vegetable oil.

16. The foam of claim 13, wherein said polyol comprises from about 10 to about 60 weight percent of said vegetable oil derived polyol and about 40 to about 90 weight percent said polyether polyol.

17. The foam of claim 12, wherein $R^5$ is a $C_{16}$ to $C_{20}$ substituted or unsubstituted alkyl or alkaryl group.

18. The foam of claim 12, wherein Z comprises —C(O)CH$_3$ or CH$_3$.

19. The foam of claim 12, wherein B comprises an allyl derivative.

20. The foam of claim 12, wherein at least one of the following is true:
 a) The $R^1$ moieties are in the range of from about 35 to about 55% by weight of EO and have a blend average molecular weight greater than 3500 daltons;
 b) The $R^2$ moieties are in the range of from about 35 to about 55% by weight of EO and have a blend average molecular weight in the range of from about 1100 to about 2300 daltons; or c) The $R^3$ moieties range from 0 up to about 100% by weight of EO and have a blend average molecular weight in the range of from about 300 to about 750 daltons.

21. The foam of claim 12, wherein at least one of the following is true:
 a) x in the range of from 60 to about 80,
 b) y in the range of from 5 to about 20,
 c) a+c in the range of from 5 to about 15, or
 d) e in the range from about 5 to 10.

22. A method of producing a flexible polyurethane foam comprising:
 A) preparing a mixture comprising:
  (1) a polyol comprising from about 10 to about 40 percent by weight of a vegetable oil derived polyol,
  (2) an organic polyisocyanate,
  (3) at least one catalyst for the production of polyurethane foams,
  (4) water, and
  (5) a surfactant; having the formula:

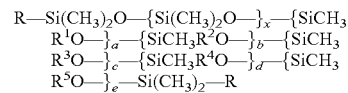

or

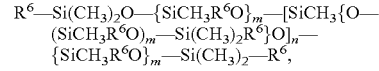

wherein:
 $R^1$, $R^2$, and $R^3$ are polyalkylene oxide polyethers of the formula:

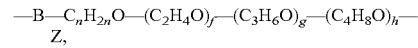

and where
 $R^1$ has a blend average molecular weight in the range of from about 3000 to about 6000 grams/mole and ethylene oxide comprises from about 20 to about 60 weight percent of the alkylene oxide content of $R^1$;
 $R^2$ has a blend average molecular weight in the range of from about 800 to about 2900 grams/mole and ethylene oxide comprises from about 20 to about 60 weight percent of the alkylene oxide content of $R^2$;
 $R^3$ has a blend average molecular weight in the range of from about 130 to about 800 grams/mole and ethylene oxide comprises from about 0 to about 100 weight percent of the alkylene oxide content of $R^3$;
 $R^4$ is a $C_1$ to $C_{12}$ substituted or unsubstituted alkyl group, an alkaryl group, or an aryl group;
 $R^5$ is a $C_{16}$ to $C_{20}$ substituted or unsubstituted alkyl or alkaryl group;
 B is a moiety capable of undergoing hydrosilation to form Si—C bonds, or a moiety capable of undergoing condensation to form Si—O—C bonds;
 Z is selected from the group consisting of hydrogen, $C_1$-$C_8$ alkyl or alkaryl moieties, —C(O)$Z^1$, —C(O)O$Z^1$, and —C(O)NH$Z^1$, where $Z^1$ represents monofunctional $C_1$-$C_8$ alkyl or aryl moieties;
 each R is independently selected from the group consisting of $R^1$, $R^2$, $R^3$, $R^4$, and $R^5$;
 each $R^6$ is independently selected from the group consisting of $R^1$, $R^2$, $R^3$, $R^4$, and $R^5$ but at least one $R^6$ must be $R^5$;
 x is 40 to 150;
 y is 5 to 40 and equals a+b+c+d+e, where b or c, but not both, may be 0, d/(a+b+c+e)=0 to 1, e>0, and a+b>0;
 m=10 to 100;
 n≤4; and
 f, g, and h can be independently selected to have any value such that the defined blend average molecular weights of the polyethers $R^1$, $R^2$, and $R^3$ are met; and
B) reacting components 1)-5) of the mixture to form a flexible polyurethane foam.

* * * * *